A. HAMILTON.
MOP OR BRUSH.
APPLICATION FILED OCT. 25, 1919.
1,339,026.
Patented May 4, 1920.
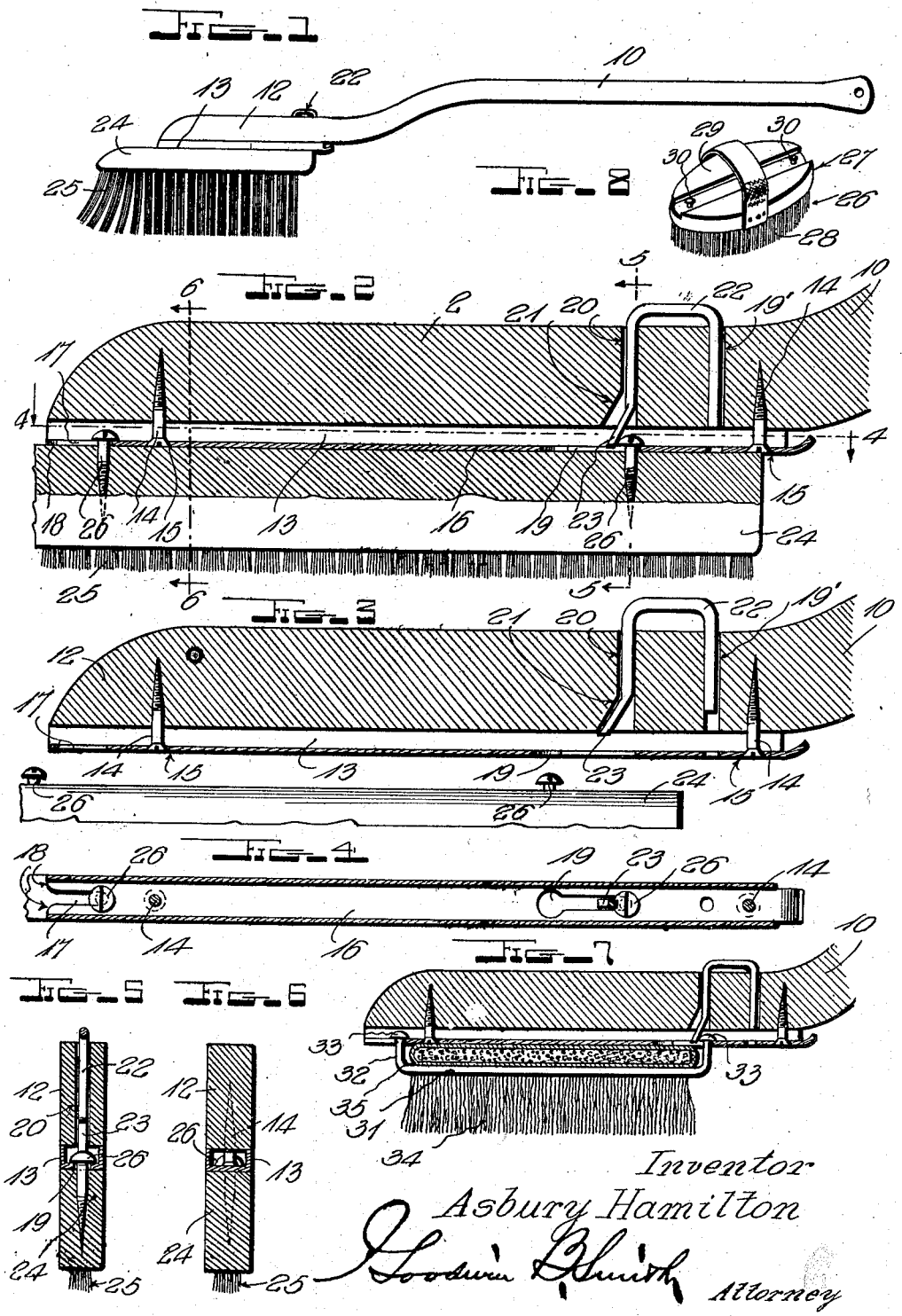
Inventor
Asbury Hamilton
Goodwin B Smith
Attorney

UNITED STATES PATENT OFFICE.

ASBURY HAMILTON, OF BROOKLYN, NEW YORK.

MOP OR BRUSH.

1,339,026.  Specification of Letters Patent.  Patented May 4, 1920.

Application filed October 25, 1919. Serial No. 333,258.

*To all whom it may concern:*

Be it known that I, ASBURY HAMILTON, a citizen of the United States, residing at Brooklyn, in the county of Kings and State of New York, have invented certain new and useful Improvements in Mops or Brushes, of which the following is a specification.

My invention relates to improvements in mops or brushes.

An important object of the invention is to provide means whereby a plurality of different cleaning elements, such as mops or brushes, may be detachably secured to a handle, in a manner to be conveniently connected and disconnected therewith.

A further object of the invention is to provide a device of the above mentioned character, which is simple in construction, inexpensive to manufacture, and convenient in use.

Other objects and advantages of the invention will be apparent during the course of the following description.

In the accompanying drawings, forming a part of this specification and in which like numerals are employed to designate like parts throughout the same, Figure 1 is a side elevation of a device embodying my invention, Fig. 2 is a central longitudinal section through the same, parts being broken away, Fig. 3 is a similar view with the brush separated from the handle, Fig. 4 is a longitudinal section taken on line 4—4 of Fig. 2, Fig. 5 is a transverse section taken on line 5—5 of Fig. 2, Fig. 6 is a similar view taken on line 6—6 of Fig. 2, Fig. 7 is a central longitudinal sectional view through a second and preferred form of the device, parts being in elevation, and, Fig. 8 is a perspective view of a third form of brush element.

In the drawings, wherein for the purpose of illustration is shown a preferred embodiment of my invention, the numeral 10 designates a handle, which is adapted to be employed in connection with each form of cleaning or brush element. This handle is provided at its forward end with a straight attaching portion 12. The numeral 13 designates a longitudinal socket or housing, which is U-shaped in cross section. This longitudinal socket is secured to the straight portion 12 by screws 14, passing through openings 15 in the base 16 of the housing.

This base 16 is provided at its forward end with a longitudinal opening 17, the forward end of which is open and has rounded shoulders 18. The base 16 is provided somewhat near its rear end with a key-hole opening 19, as shown.

The straight portion 12 is provided near its rear end with transverse openings 19' and 20, the opening 20 having an angular portion 21. The numeral 22 designates a U-shaped keeper, having its arms mounted to slide in the openings 19 and 20. The forward arm is provided with an angular extension 23, operating within the recess 21, and adapted to be projected into the rear contracted portion of the key-hole opening 19, near and spaced from its rear end.

In Figs. 1 to 6, inclusive, I have shown a cleaning element, in the form of a dust-brush. This dust-brush embodies a rigid head 24, formed of wood or the like, and carrying the hairs or bristles 25. The head 24 is provided with headed pins or elements 26, adapted for insertion within the openings 17 and 19. These headed pins are introduced into the forward ends of the openings 17 and 19, and the head 24 is then shifted rearwardly whereby the headed pins engage the end walls at the rear of such openings. The keeper 22 is now forced downwardly, as indicated in Fig. 2, and the angular extension 23 thereof is projected into the opening 19, in advance of the rear headed pin 26, thereby locking the head 24 to the straight portion 12.

In Fig. 8 I have shown a brush 26, which may be a clothes-brush or the like. This brush embodies a head 27, carrying the hairs or bristles 28. The head 27 has a longitudinal groove 29, adapted to receive the straight portion 12, and headed pins 30 are arranged within the groove 29 and secured to the head 27. These headed pins are adapted to enter the openings 17 and 19, as described in connection with the headed pins 26, all other elements of the device operating in a similar manner.

In Fig. 7 I have shown a further and preferred different form of the invention. This form embodies a rod or head 31, having its ends upturned at 32, and provided with heads 33. These upturned ends constitute headed pins carried by the head 31. The mop further comprises strands or cords 34, which extend transversely of a binding 35. This binding is held between the head 31 and the socket 13, while the strands extend downwardly upon opposite sides of the head or rod 31. The headed ends or pins 32 are inserted into the openings 17 and 19, and moved longitudinally therein to engage their rear end walls, subsequently to which the keeper 22 is moved downwardly, whereby its angular extension 23 will engage the rear head 33.

In view of the foregoing description, it is thought to be obvious that the several cleaning elements may be used in connection with the single handle, and that the change may be made quickly and conveniently.

It is to be understood that the forms of my invention herewith shown and described are to be taken as preferred examples of the same, and that various changes in the shape, size, and arrangement of parts may be resorted to without departing from the spirit of my invention, or the scope of the subjoined claims.

Having thus described my invention, I claim:—

1. A device of the character described, comprising a handle, a longitudinal socket secured thereto and provided with openings, a cleaning element embodying a supporting member carrying headed elements which are adapted for insertion within said openings, and a keeper carried by the handle and having one end thereof adapted to be projected into one of said openings in advance of the headed element therein.

2. A device of the character described, comprising a handle provided with a transverse opening, a longitudinal socket secured to the handle and having longitudinal openings provided with inlet ends, a cleaning element embodying a supporting member carrying headed elements which are adapted for insertion within said openings, and a keeper mounted to slide within the transverse opening of the handle and adapted to be projected into one of the longitudinal openings in advance of the headed element therein.

3. A device of the character described, comprising a handle provided with a pair of transverse openings, one opening having an angular portion, a longitudinal socket secured to the handle and provided with a base having longitudinal openings provided with intake ends, a cleaning element embodying a supporting member carrying headed elements which are adapted for insertion within said longitudinal openings, and a U-shaped keeper having arms operating within the transverse openings, one arm having an angular extension operating within said angular portion of the transverse opening and being adapted to be projected into one longitudinal opening in advance of the headed element therein.

4. In a mop of the character described, a handle having transverse guide means, a longitudinal socket carried by the handle and having openings formed therein, a rod having its ends bent transversely and provided with heads, such headed ends being adapted for insertion within said openings, a keeper operating within the guide means and having one end adapted to be projected into one of said openings in advance of the headed end therein, and a mop-body held between the rod and the longitudinal socket.

In testimony whereof I affix my signature in presence of two witnesses.

ASBURY HAMILTON.

Witnesses:
S. DOBLIN,
ARNOLD H. LANDIN.